(12) United States Patent
Takahashi

(10) Patent No.: US 12,304,020 B2
(45) Date of Patent: May 20, 2025

(54) ROTATIONAL POSITIONING DEVICE

(71) Applicant: SANKYO SEISAKUSHO CO., Tokyo (JP)

(72) Inventor: Naoyuki Takahashi, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 480 days.

(21) Appl. No.: 17/773,472

(22) PCT Filed: Aug. 21, 2020

(86) PCT No.: PCT/JP2020/031647
§ 371 (c)(1),
(2) Date: Apr. 29, 2022

(87) PCT Pub. No.: WO2021/090551
PCT Pub. Date: May 14, 2021

(65) Prior Publication Data
US 2022/0347807 A1  Nov. 3, 2022

(30) Foreign Application Priority Data
Nov. 8, 2019 (JP) .................... 2019-203234

(51) Int. Cl.
*B23Q 1/52* (2006.01)
*F16C 19/14* (2006.01)
*F16M 11/08* (2006.01)

(52) U.S. Cl.
CPC ............... *B23Q 1/52* (2013.01); *F16C 19/14* (2013.01); *F16M 11/08* (2013.01)

(58) Field of Classification Search
CPC ............ B23Q 1/52; F16C 19/14; F16M 11/08
See application file for complete search history.

(56) References Cited

U.S. PATENT DOCUMENTS 4,080,849 A * 3/1978 Benjamin ............ B23Q 16/102
74/820
7,603,930 B2 * 10/2009 Kato .................... B23Q 1/5437
269/61

(Continued)

FOREIGN PATENT DOCUMENTS

CN       1500589 A    6/2004
CN     107020544 A    8/2017

(Continued)

OTHER PUBLICATIONS

Office Action dated Jul. 11, 2024 in corresponding Japanese Patent Application No. 2021-554824 with translation.

(Continued)

*Primary Examiner* — Seahee Hong
(74) *Attorney, Agent, or Firm* — Harness, Dickey & Pierce, P.L.C.

(57) ABSTRACT

Provided is a rotational positioning device capable of positioning a rotational angle at a target angle position with high precision. A rotational positioning device is provided with: a housing; a rotational member which is rotatable about a rotational member axial line and at least a part of which is accommodated in the housing; and at least one sensor installed in the housing. A graduated scale with a plurality of scale marks is formed integrally with the rotational member along the circumferential direction of the rotational member. The at least one sensor detects an angle change amount due to rotation of the rotational member on the basis of the plurality of scale marks. The rotational member is positioned at the target angle position on the basis of the angle change amount.

8 Claims, 14 Drawing Sheets

(56) References Cited

U.S. PATENT DOCUMENTS

| | | | |
|---|---|---|---|
| 2004/0146369 A1 | 7/2004 | Kato | |
| 2005/0097976 A1* | 5/2005 | Nitta | B23Q 1/265 |
| | | | 74/425 |
| 2010/0089201 A1* | 4/2010 | Nakamura | B23Q 16/025 |
| | | | 74/813 R |
| 2010/0275726 A1* | 11/2010 | Tatsuda | B23Q 1/287 |
| | | | 74/813 R |
| 2010/0313708 A1* | 12/2010 | Tatsuda | B23Q 1/52 |
| | | | 409/216 |
| 2011/0120265 A1* | 5/2011 | Cafuta | B23Q 16/025 |
| | | | 74/813 R |
| 2012/0011964 A1* | 1/2012 | Tatsuda | B23Q 1/525 |
| | | | 74/813 R |
| 2013/0200885 A1* | 8/2013 | Asano | G01B 7/30 |
| | | | 324/207.21 |
| 2014/0236520 A1 | 8/2014 | Engel et al. | |
| 2015/0142377 A1 | 5/2015 | Kishida et al. | |
| 2017/0120410 A1 | 5/2017 | Meissner | |
| 2017/0292856 A1 | 10/2017 | Takiguchi et al. | |
| 2020/0230768 A1* | 7/2020 | Bauer | B23Q 16/025 |
| 2021/0215512 A1* | 7/2021 | Katsumata | G01D 5/24485 |

FOREIGN PATENT DOCUMENTS

| | | |
|---|---|---|
| EP | 2108926 A2 | 10/2009 |
| EP | 2828577 A1 | 1/2015 |
| EP | 3175949 A1 | 6/2017 |
| JP | H0781747 A | 3/1995 |
| JP | 2000158293 A | 6/2000 |
| JP | 2004160642 A | 6/2004 |
| JP | 200514210 A | 1/2005 |
| JP | 200698392 A | 4/2006 |
| JP | 201099789 A | 5/2010 |
| JP | 201199802 A | 5/2011 |
| JP | 201199804 A | 5/2011 |
| JP | 201787416 A | 5/2017 |
| TW | 200414961 A | 8/2004 |
| WO | WO-2007/111261 A1 | 10/2007 |

OTHER PUBLICATIONS

Extended European Search Report dated Sep. 12, 2023 in corresponding European Application No. 20883796.3.
Office Action dated Mar. 31, 2023 in corresponding CN Application No. 202080071474.9.
International Search Report dated May 14, 2024 in corresponding Taiwan Patent Application No. 109131734 with translation.
Office Action dated May 14, 2024 in corresponding Taiwan Patent Application No. 109131734 with translation.
International Search Report issued in PCT/JP2020/031647, mailed on Oct. 27, 2020.
Office Action and Search Report dated Oct. 28, 2023 in corresponding CN Application No. 202080071474.9.
Search Report and Decision of Rejection dated Mar. 7, 2024 in corresponding Chinese Application No. 202080071474.9 with translation.
Office Action dated Oct. 29, 2024 in corresponding Korean Patent Application No. 10-2022-7015270 with translation.

* cited by examiner

SENSOR: j = 1 TO 8

SENSOR: j = 1 TO 5

ROTATIONAL POSITIONING DEVICE

CROSS-REFERENCE TO RELATED APPLICATIONS

This application is a 371 U.S. National Phase of International Application No. PCT/JP2020/031647 filed on Aug. 21, 2020, which claims the benefit of priority from Japanese Patent Application No. 2019-203234 filed on Nov. 8, 2019. The entire disclosure of the above applications is incorporated herein by reference.

TECHNICAL FIELD

The present invention relates to a rotational positioning device capable of positioning a rotational angle at a target angle position with high precision.

BACKGROUND ART

The rotational positioning device generally has an input shaft into which a driving force such as a motor is input and an output shaft on which a rotational table for loading a machining work and the like of a machine tool is mounted. An angle detector such as an encoder is installed to the input shaft or output shaft, and the angle detector detects an angle change amount due to rotation of the rotational table. The rotational positioning device controls a driver and a motor based on the detected angle change amount to rotate and position the rotational table at a target angle position.

Patent Literature 1 discloses a roller turret cam index device. The roller turret cam index device includes a roller gear and a roller gear cam that are meshed with each other. The roller gear and the roller gear cam are rotatably provided around two rotation axial lines that three-dimensionally cross. In this roller turret cam index device, an encoder, which is a rotation angle detector, is fixed to the housing by an adapter. The input shaft of the encoder is connected to the roller gear shaft of the roller gear by a coupling so as not to be relatively rotatable to the roller gear shaft. Thereby, the encoder detects the rotation of the roller gear shaft. The value detected by the encoder represents the rotation stop position of the roller gear, that is, the index position.

Patent Literature 2 discloses a rotational table device. The rotational table device includes: a circular table on which a work is loaded; a rotational shaft for supporting the rotary table; a frame for rotatably supporting the rotational shaft; and a motor accommodated between the frame and the rotational shaft. When the motor is driven, the circular table, together with the rotational shaft, rotates about the rotational shaft axial line, with respect to the frame, and the angle position of the circular table is determined. The rotational shaft is composed of two shaft members. Both the shaft members are combined in a state in which their axial lines are aligned, and are connected by a screw member. There is an annular space between the frame and the rotational shaft, and the space is provided with a motor, a thrust bearing, a radial bearing, and a rotation detector. The rotation detector includes an encoder for detecting a rotation amount of the rotational shaft and an object to be detected by the encoder. The encoder provided on the frame detects the object to be detected separately provided on one of the shaft members of the rotational shaft. Thus, based on the detection signal from the encoder, the rotation amount of the rotational shaft is detected.

CITATION LIST

Patent Literature

PATENT LITERATURE 1: JP-A-2000-158293
PATENT LITERATURE 2: JP-A-2010-99789
PATENT LITERATURE 3: JP-A-2006-98392
PATENT LITERATURE 4: JP-A-2011-99802
PATENT LITERATURE 5: JP-A-2011-99804

SUMMARY OF INVENTION

Technical Problem

The roller turret cam index device of Patent Literature 1 has the encoder externally installed. This increases the size of the roller turret cam index device by the volume of the encoder and further leads to higher cost. The device of Patent Literature 1 has such problems. In addition, the encoder externally installed generates an offset between the rotation axial line of the encoder input shaft and the rotation axial line of the roller gear shaft, during assembly in connecting the encoder input shaft and the roller gear shaft. The offset is also called a center deviation. The influence of the assembly error caused by this center deviation generates an error in angle change amount, of the roller gear, detected by the encoder. The influence further generates an error in the target angle position of the roller gear. The device of Patent Literature 1 also has such problems. Furthermore, although the roller gear is generally hollow, the encoder externally installed structurally blocks one of the hollow openings. This does not allow the roller gear to pass the cables, hydraulic parts, and the like through the hollow. The device of Patent Literature 1 also has such a problem.

A rotational table device of Patent Literature 2 has a rotational shaft composed of two shaft members. Both the shaft members are combined with their axial line aligned. However, as in Cited Document 1, a center deviation is generated during assembly in combining the two shaft members. In addition, a center deviation is generated during assembly in separately providing an object to be detected on one of the shaft members of the rotational shaft. The influence of the assembly errors caused by these center deviations generates an error in the angle change amount, of the rotational shaft, detected by the rotation detector. The influence further generates an error in the target angle position of the rotational shaft. The device of Patent Literature 2 has such problems. Further, the raceway surface of the bearing is separately provided on the rotational shaft. The assembly error during assembly in separately providing the raceway surface generates an error in the angle change amount, of the rotational shaft, detected by the rotation detector. The influence further generates an error in the target angle position of the rotational shaft. The device of Patent Literature 2 also has such problems.

Therefore, an object of the present invention is to solve the above-mentioned problems to provide a rotational positioning device capable of positioning a rotational angle at a target angle position with high precision.

Solution to Problem

According to one aspect of the present invention is a rotational positioning device including: a housing; a rotational member rotatable about a rotational member axial line, at least a part of the rotational member being accommodated in the housing; and at least one sensor installed in the housing, wherein a graduated scale having a plurality of scale marks is integrally formed with the rotational member along a circumferential direction of the rotational member, the at least one sensor detects an angle change amount due to rotation of the rotational member based on the plurality of scale marks, and the rotational member is positioned at a target angle position based on the angle change amount.

According to a specific example of the present invention, the rotational positioning device is configured such that the graduated scale is integrally formed with the rotational member in a radial direction with respect to the rotational member axial line or a direction parallel to the rotational member axial line.

According to a specific example of the present invention, the rotational positioning device is configured such that at least one seat is provided in the housing, and each of the at least one sensor is installed in a corresponding seat of each sensor so as to define a position of each sensor and a gap between each sensor and the scale marks.

According to a specific example of the present invention, the rotational positioning device is configured such that the at least one seat is provided in the housing via a sensor flange.

According to a specific example of the present invention, the rotational positioning device is configured such that a rotational member hole for passing at least a part of the rotational member is provided in the sensor flange, and a central axis line of the rotational member hole is aligned with the rotational member axial line.

According to a specific example of the present invention, the rotational positioning device is configured such that the at least one seat is two or more seats provided along the circumferential direction of the rotational member, the two or more seats are provided such that distances from the rotational member axial line are the same and distances between adjacent seats are the same, the at least one sensor is two or more sensors, and each of the two or more sensors is installed in any one of the two or more seats.

According to a specific example of the present invention, the rotational positioning device further includes a bearing for supporting rotation of the rotational member with respect to the housing, wherein a raceway surface of the bearing is integrally formed with the rotational member.

According to a specific example of the present invention, the rotational positioning device is configured such that the graduated scale is integrally formed with a part of the rotational member accommodated in the housing.

According to a specific example of the present invention, the rotational positioning device is configured such that the rotational member is an output shaft, a rotational table is provided at an end part of the output shaft, and the graduated scale is integrally formed with a part of the output shaft, the part being adjacent to the rotational table.

According to a specific example of the present invention, the rotational positioning device, having the rotational member that is an input shaft, further includes an output shaft rotatable about an output shaft axial line, the output shaft having a transmission mechanism installed along a circumferential direction of the output shaft, wherein the input shaft comes into contact with the transmission mechanism, and thereby the output shaft can rotate with rotation of the input shaft.

Advantageous Effects of Invention

According to the present invention, the rotational positioning device can detect the angle change amount of the rotational member with high precision, and can further position the rotational member at the target angle position with high precision.

Oher objects, features, and advantages of the present invention will become apparent from the following description of the embodiments of the present invention taken in conjunction with the accompanying drawings.

DESCRIPTION OF EMBODIMENTS

Embodiments according to the present invention will be described with reference to drawings. However, the present invention is not limited to those embodiments.

Figure 1:
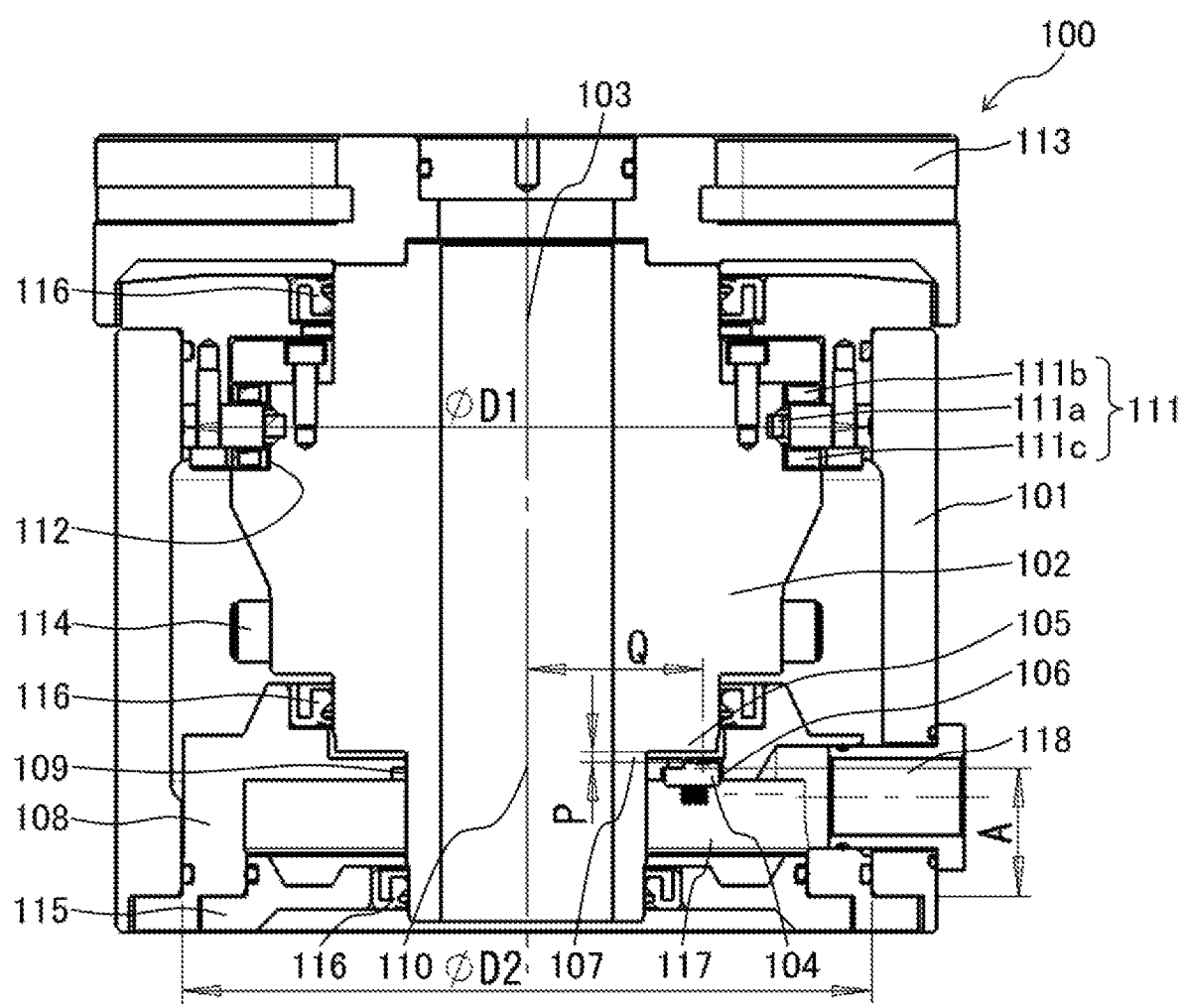
FIG. 1 is a cross-sectional view of a rotational positioning device according to an embodiment of the present invention, in which a graduated scale is integrally formed in a radial direction with respect to a rotational member axial line.
Figure 2:
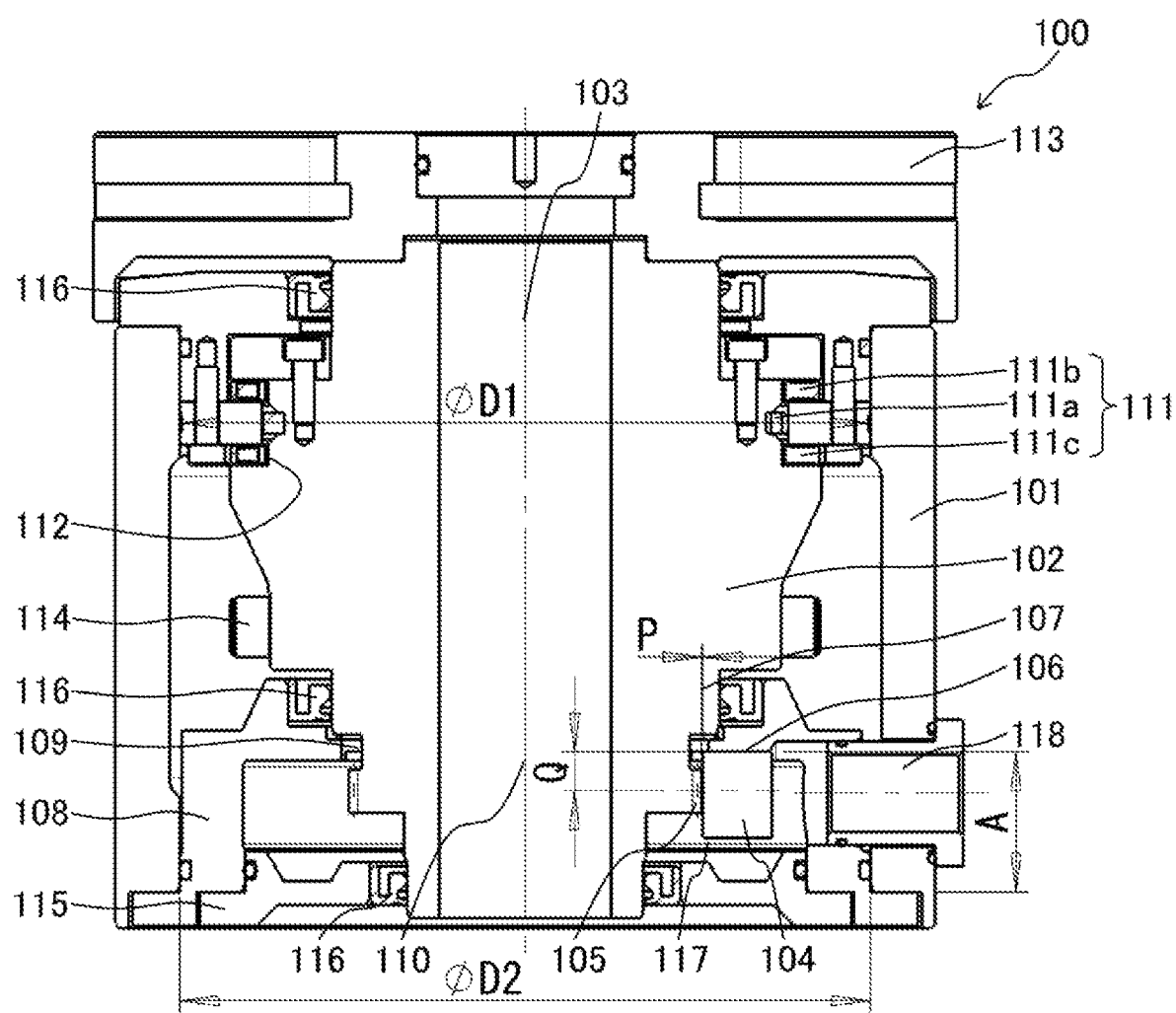
FIG. 2 is a cross-sectional view of a rotational positioning device according to another embodiment of the present invention, in which a graduated scale is integrally formed in a direction parallel to a rotational member axial line.
Figure 3:
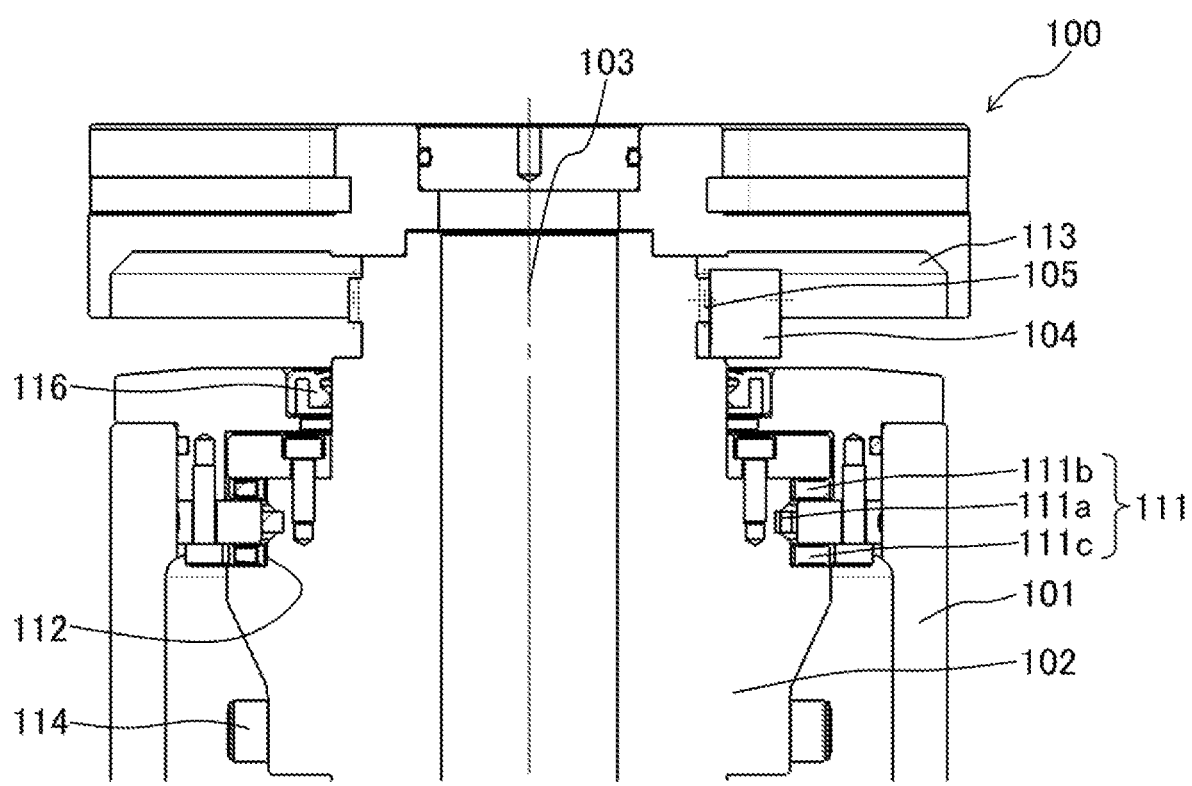
FIG. 3 is a partial cross-sectional view of a rotational positioning device according to still another embodiment of the present invention, in which a graduated scale is integrally formed in a direction parallel to a rotational member axial line.

First, with reference to FIGS. 1 to 3, the rotational positioning device 100 is to be described according to some embodiments of the present invention. FIGS. 1 to 3 show cross-sectional views of the rotational positioning device 100. The rotational positioning device 100 includes: a housing 101; a rotational member 102 rotatable about a rotational member axial line 103; and at least one sensor 104, installed in the housing 101, serving as an angle detector. In FIG. 1, although the rotational member 102 is entirely accommodated in the housing 101, at least a part of the rotational member 102 may be accommodated in the housing 101. A graduated scale 105 having a plurality of scale marks is integrally formed with the rotational member 102 along the circumferential direction of the rotational member 102.

As shown in FIG. 1, the scale marks of the graduated scale 105 may be formed integrally with the rotational member 102 in the radial direction with respect to the rotational member axial line 103 along the circumferential direction of the rotational member 102. Alternatively, as shown in FIG. 2, the scale marks of the graduated scale 105 may be integrally formed with the rotational member 102 in a direction parallel to the rotational member axial line 103. The scale marks may be formed integrally with the rotational member 102 in a gear shape, or may be a linearly engraved rotational member 102. Further, the scale marks are not limited to ones that can be visually recognized, and any scale marks may be used as long as they allow the sensor 104 to read a predetermined positional interval on the graduated scale 105 as an interval for one scale mark. The graduated scale 105 may be integrally formed with the rotational member 102 along the circumferential direction of any part of the rotational member 102. For example, the graduated scale 105 may be formed on a lower part of the rotational member 102 as shown in FIGS. 1 and 2, or may be formed on an upper part of the rotational member 102 as shown in FIG. 3. Further, the graduated scale 105 may be formed on a part of the rotational member 102 inside the housing 101 as shown in FIGS. 1 and 2, or may be formed in a part of the rotational member 102 outside the housing 101 as shown in FIG. 3.

When the rotational member 102 is an output shaft in the rotational positioning device 100, a rotational table 113 is provided at the end part of the rotational member 102 serving as the output shaft, as shown in FIGS. 1 to 3. When the rotational member 102 rotates about the rotational member axial line 103, the rotational table 113 rotates accordingly. As shown in FIGS. 1 and 2, the graduated scale 105 may be integrally formed with a part of the rotational member 102, serving as an output shaft, accommodated in the housing 101. The graduated scale 105 may be formed on the lower part of the rotational member 102, or may be formed on the upper part of the rotational member 102. Thus, integrally forming the graduated scale 105 on the rotational member 102 serving as the output shaft allows detecting the angle change amount of the rotational table 113 with high precision. Then, this allows positioning the rotational table 113 at the target angle position with high precision. As shown in FIGS. 1 to 3, the rotational member 102 may be provided with a transmission mechanism 114. Via the transmission mechanism 114, driving force from an input shaft may be transmitted to rotate the rotational member 102 serving as the output shaft. Further, the rotational member 102 may be configured without any transmission mechanism 114. With such a configuration, a driving device such as a motor may be directly connected to the rotational member 102 to rotate the rotational member 102.

The graduated scale 105 may be integrally formed with a part of the rotational member 102, serving as an output shaft, adjacent to the rotational table 113. For example, as shown in FIG. 3, the graduated scale 105 may be integrally formed with a part of the rotational member 102, serving as an output shaft, between the housing 101 and the rotational table 113. Thus, forming the graduated scale 105 integrally with the rotational member 102, serving as an output shaft, so as to be adjacent to the rotational table 113 allows detecting the angle change amount of the rotational table 113 with further high precision. Then, this allows positioning the rotational table 113 at the target angle position with high precision.

The principle of the sensor 104 is not particularly limited as long as the sensor can read the scale marks of the graduated scale 105. Examples of the sensor 104 include an optical sensor, a magnetic sensor, a coil, and the like. For example, when an optical sensor is installed as the sensor 104, in order to change the light reflection state and transmission state, a linearly engraved part on the rotational member 102 may be integrally formed with the rotational member 102 to form scale marks. When a magnetic sensor is installed as the sensor 104, in order to change the magnetic poles, a part configured in a gear shape on the rotational member 102 may be integrally formed with the rotational member 102 to form scale marks. The sensor 104 then reads a graduated scale 105 having a plurality of scale marks integrally formed with the rotational member 102 along the circumferential direction of the rotational member 102. Thereby, the angle change amount due to rotation of the rotational member 102 is detected based on the plurality of scale marks. Thus, integrally forming the graduated scale 105 on the rotational member 102: can reduce the influence of the center deviation due to the graduated scale 105; allows the rotational positioning device 100 to detect the angle change amount of the rotational member 102 with high precision; and then allows the rotational member 102 to be positioned at a target angle position with high precision. In addition, this can make the rotational positioning device 100 compact, reduce the number of parts thereof, and reduce the cost thereof.

The housing 101 is provided with at least one seat 106 for installing at least one sensor 104. When two or more seats 106 are provided in the housing 101, the respective seats 106 are provided along the circumferential direction of the rotational member 102. Here, the respective seats 106 are also provided so as to be equal in the distance from the rotational member axial line 103 of the rotational member 102, and to be equal in the distance to adjacent seat(s) 106. Each of the sensors 104 is installed in any of two or more seats 106. Not all the seats 106 need to have the sensors 104 installed thereon, and there may be a configuration in which only some of the seats 106, as an option, have the sensors 104 installed thereon. Each sensor 104 is installed in its corresponding seat 106 to define the position of each sensor 104 with respect to the rotational member 102 and to define a gap 107 (P) between each sensor 104 and the scale marks of the graduated scale 105. The seat 106 guarantees a gap 107 (P) and determines the distance of each sensor 104 from the rotational member axial line 103 of the rotational member 102. Thus, installing two or more sensors 104 determines the distance between two adjacent sensors 104, and guarantees the position (Q) for each sensor 104 to read the scale marks of the graduated scale 105. As a result, the sensor 104 and the graduated scale 105 are positioned with respect to the rotational member axial line 103 of the rotational member 102. This allows the rotational positioning device 100 to detect the angle change amount of the rotational member 102 with high precision; this then allows the rotational member 102 to be positioned at a target angle position with high precision.

The rotational positioning device 100 may further include a bearing 111 for supporting the rotation, of the rotational member 102, with respect to the housing 101. The raceway surface 112 of the bearing 111 may be integrally formed with the rotational member 102 as shown in FIGS. 1 to 3. As result, the sensor 104, the graduated scale 105, and the bearing 111 are positioned with respect to the rotational member axial line 103 of the rotational member 102. This allows the rotational positioning device 100 to detect the angle change amount of the rotational member 102 with high precision; this then allows the rotational member 102 to be positioned at a target angle position with high precision. Further, as shown in FIG. 1, the central axis line of the inner diameter (D1) of the housing 101 part corresponding to the raceway surface 112 is aligned with the rotational member axial line 103 of the rotational member 102. In FIGS. 1 to 3, although the radial bearing 111*a*, the first thrust bearing 111*b*, and the second thrust bearing 111*c* are provided as the bearing 111, the configuration of the bearing is not limited thereto. Any configuration is allowed as long as the raceway surface 112 of the bearing 111 is integrally formed with the rotational member 102.

FIGS. 4A to 4E relate to the rotational positioning device 100 of the embodiment shown in FIG. 1, in which the rotational member 102 is used as an output shaft, and a rotational table 113 is provided at an end part of the rotational member 102 serving as an output shaft. The graduated scale 105 has a plurality of scale marks at substantially equal intervals. The graduated scale 105 are formed integrally with the rotational member 102 in the radial direction with respect to the rotational member axial line 103 along the circumferential direction of the rotational member 102. Further, the rotational positioning device 100 may further include a second rotational member 119 rotatable about a second rotational member axial line 120. In the rotational positioning device 100 of FIG. 4B, there is employed a roller gear cam mechanism having a rotational member 102 serving as an output shaft and a second rotational member 119 serving as an input shaft. Here, the second rotational member 119 is a cam that has a screw-shaped cam rib and is rotatable about the second rotational member axial line 120. The rotational member 102 is rotatable about the rotational member axial line 103 orthogonal to the second rotational member axial line 120. A plurality of bearings included in the transmission mechanism 114 are arranged on the rotational member 102 along the circumferential direction thereof. A motor 121 is connected to the second rotational member 119. The motor 121 is driven to rotate the second rotational member 119 about the second rotational member axial line 120. This transmits the input torque of the cam to the rotational member 102 via the plurality of bearings included in the transmission mechanism 114, and rotates the rotational member 102 about the rotational member axial line 103. Each of the plurality of bearings included in the transmission mechanism 114 may be in a rolling contact with the cam rib of the second rotational member 119, or may be a roller follower or a cam follower. Further, the plurality of bearings included in the transmission mechanism 114 each include a shaft member, an outer ring part rotatable along the outer peripheral surface of the shaft member, and the like. Further, each of the plurality of bearings may be a bearing with rolling contact including rollers and the like between the shaft member and the outer ring part, or may be a bearing with sliding contact not including rollers and the like. In this case, the shaft member may be directly fitted to the rotational member 102.

Figure 4A:
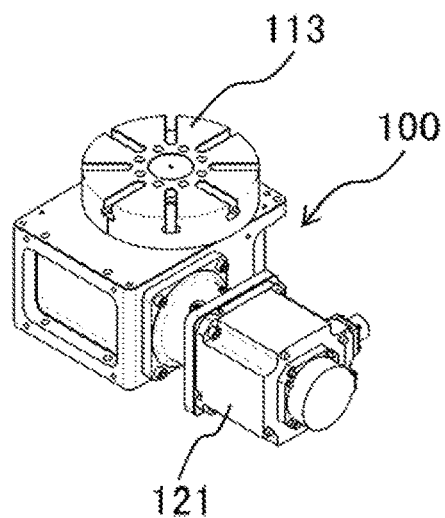
FIG. 4A is a perspective view of the rotational positioning device according to the embodiment shown in FIG. 1.
Figure 4B:
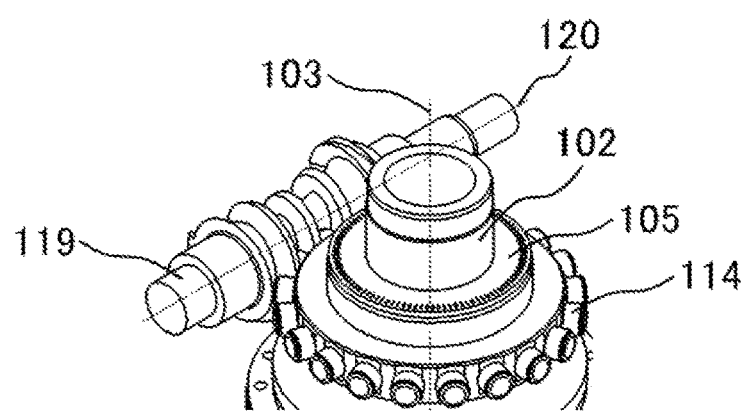
FIG. 4B is a perspective view of an inside of the rotational positioning device according to the embodiment shown in FIG. 1.

In FIG. 4B, although the second rotational member 119 serving as the input shaft is a drum-shaped cam, it may be a cylindrical cam (barrel cam) or a globoidal cam. Further, the second rotational member 119 serving as the input shaft and the rotational member 102 serving as the output shaft are in a circumscribed positional relationship. However, depending on the shape of the cam of the second rotational member 119 serving as the input shaft, the one rotational member may be in an inscribed positional relationship to the other rotational member. Further, the roller gear cam mechanism is employed in the rotational positioning device 100 of FIG. 4B. However, any mechanism is allowed as long as it can transmit the input torque of the second rotational member 119 to the rotational member 102 via the transmission mechanism 114. For example, a barrel cam mechanism may be employed, or a gear mechanism may be employed.

Figure 4C:
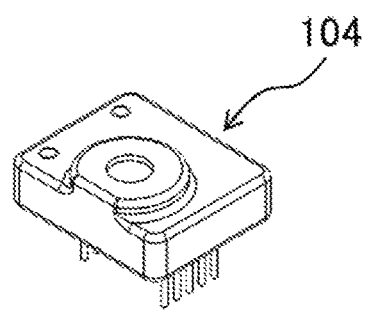
FIG. 4C is a perspective view of a sensor in the rotational positioning device according to the embodiment shown in FIG. 1.
Figure 4D:
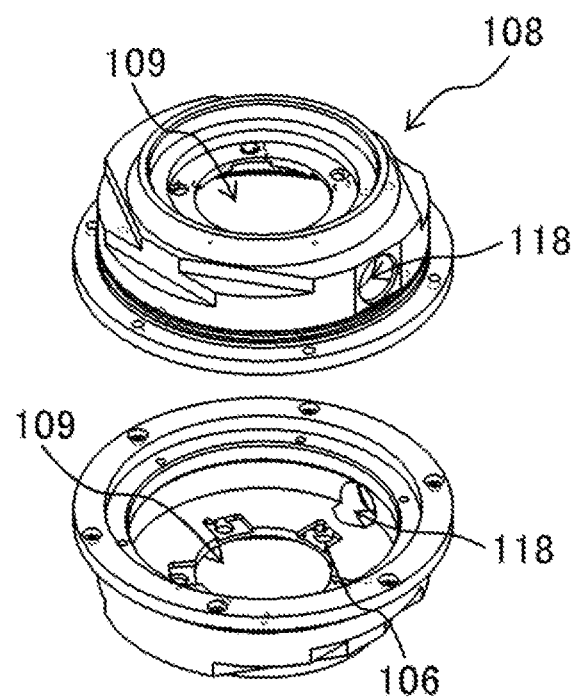
FIG. 4D is a perspective view of a sensor flange in the rotational positioning device according to the embodiment shown in FIG. 1 as viewed from above and below.
Figure 4E:
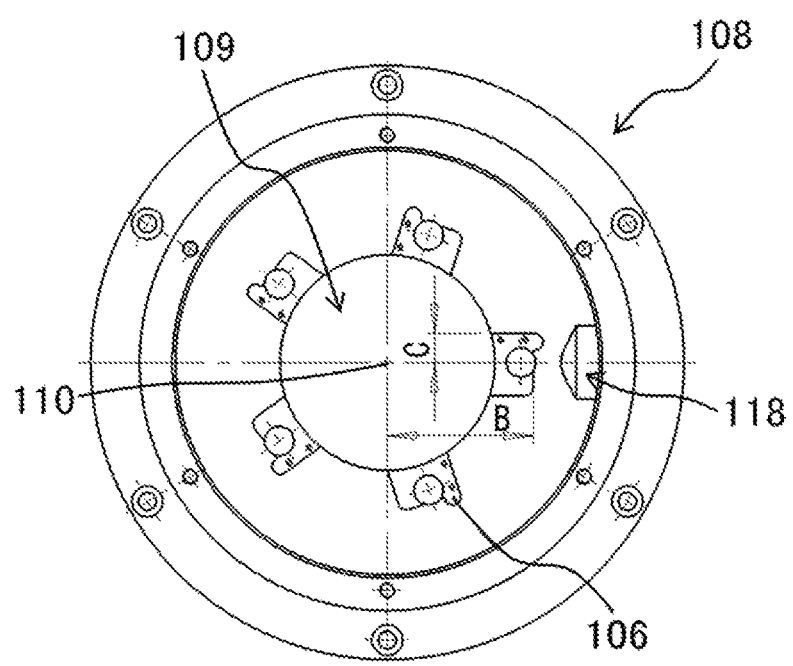
FIG. 4E is a bottom view of the sensor flange in the rotational positioning device according to the embodiment shown in FIG. 1.

At least one seat 106 may be provided in the housing 101 via a sensor flange 108 shown in FIGS. 4D and 4E. In other words, the sensor 104 is installed in the housing 101 via the seat 106 provided in the sensor flange 108. FIG. 4C shows the shape of the sensor 104 to be installed on the seat 106 of the sensor flange 108. The sensor flange 108 is provided with a rotational member hole 109 for passing at least a part of the rotational member 102. As shown in FIG. 1, the central axis line 110 of the rotational member hole 109 is aligned with the rotational member axial line 103 of the rotational member 102. The central axis line of the inner diameter (D2) of the housing 101 part corresponding to the sensor flange 108 is also aligned with the rotational member axial line 103 of the rotational member 102, as shown in FIG. 1. As a result, the central axis line of the inner diameter (D2) is also aligned with the central axis line 110 of the rotational member hole 109. Thus, installing the sensor 104 in the housing 101 via the sensor flange 108 causes the sensor flange 108 to determine the position of the sensor 104. This facilitates adjusting the position of the sensor 104 even after assembling the rotational positioning device 100. There is an installation surface of the sensor flange 108 for installing the sensor flange 108 on the housing 101. The sensor flange 108 defines the distance (A) from this installation surface to the sensor 104 installed on the sensor flange 108, and guarantees a gap 107 (P). Further, the sensor flange 108 defines the distance (B) of the seat 106 from the central axis line 110 of the rotational member hole 109. The sensor flange 108 also defines the position (C) of the seat 106 in the circumferential direction of the rotational member hole 109. Thereby, the sensor flange 108 guarantees the position (Q) in which the sensor 104 reads the scale marks of the graduated scale 105. Further, the sensor flange 108 may be provided with a cable hole 118. Then, a cable may be connected to the sensor 104 via the cable hole 118 to receive a signal, detected by the sensor 104, regarding the angle change amount due to rotation of the rotational member 102.

As shown in FIGS. 1 and 2, the housing 101 may be provided with a seal flange 115. Then, the sensor flange 108 and the seal flange 115 may provide a sensor and cable installation space 117 therebetween. A seal 116 may be provided between the rotational member 102 and the sensor flange 108 to prevent the lubricant from entering the sensor and cable installation space 117. Alternatively, the seal 116 may be provided between the rotational member 102 and the seal flange 115 to isolate the sensor and cable installation space 117 from the external space.

Figure 5A:
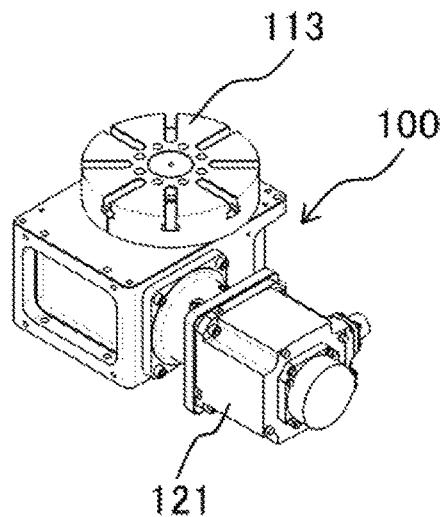
FIG. 5A is a perspective view of the rotational positioning device according to the embodiment shown in FIG. 2.
Figure 5B:
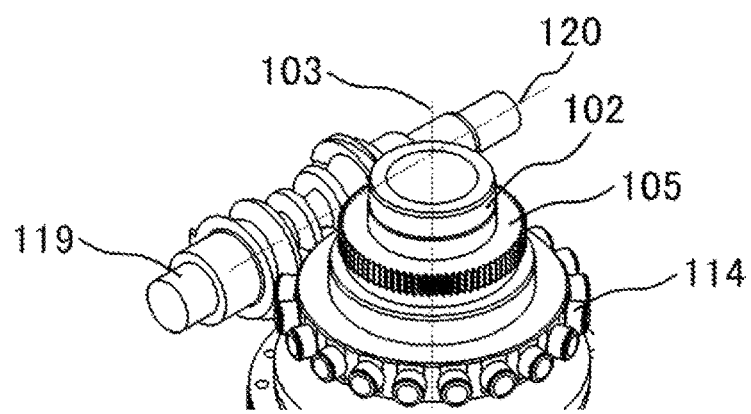
FIG. 5B is a perspective view of an inside of the rotational positioning device according to the embodiment shown in FIG. 2.
Figure 5C:
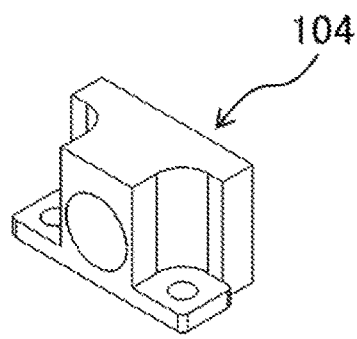
FIG. 5C is a perspective view of a sensor in the rotational positioning device according to the embodiment shown in FIG. 2.
Figure 5D:
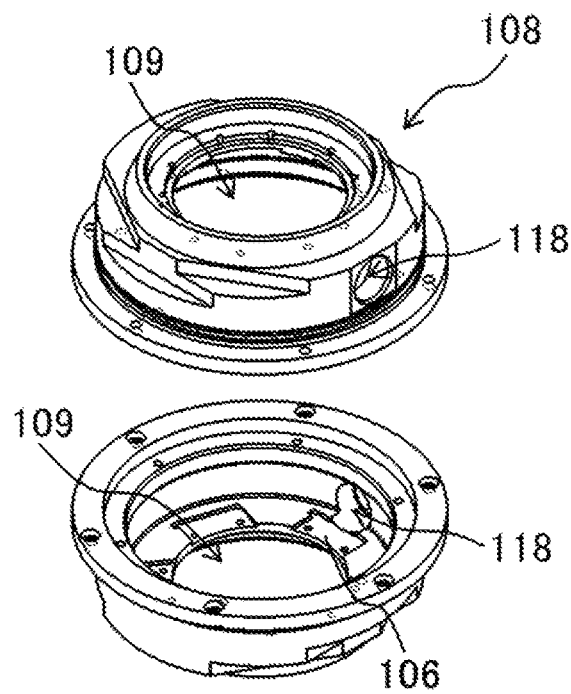
FIG. 5D is a perspective view of the sensor flange in the rotational positioning device according to the embodiment shown in FIG. 2 as viewed from above and below.
Figure 5E:
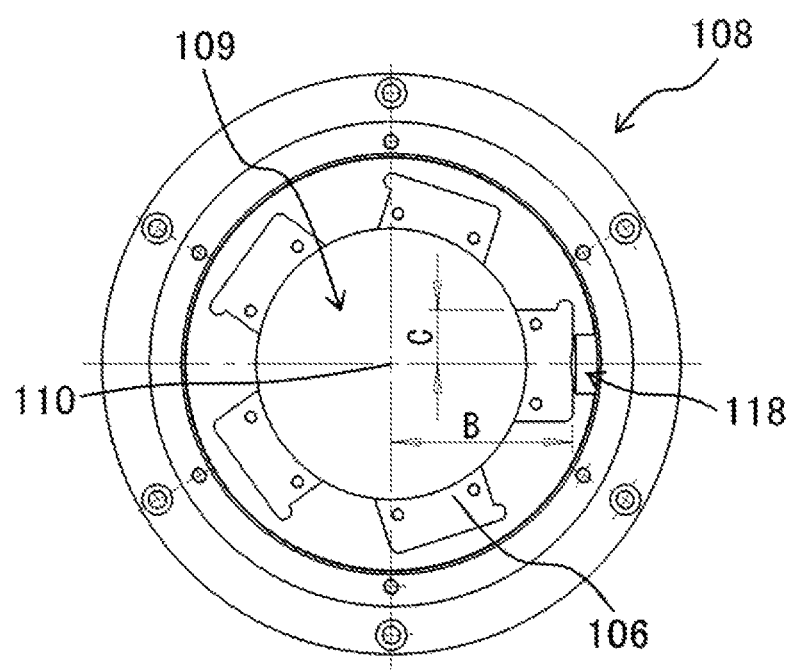
FIG. 5E is a bottom view of a sensor flange in the rotational positioning device according to the embodiment shown in FIG. 2.

FIGS. 5A-5E relate to the rotational positioning device 100 of the embodiment shown in FIG. 2, and are substantially the same as those of FIGS. 4A-4E. However, the different point is, as shown in FIG. 5B, that a graduated scale 105, having a plurality of scale marks at substantially equal intervals, is formed integrally with the rotational member 102 in a direction parallel to the rotational member axial line 103 along the circumferential direction of the rotational member 102. Further, according to the formed graduated scale 105, the shape of the sensor flange 108 is changed as shown in FIGS. 5D and 5E, and the shape of the sensor 104 is changed as shown in FIG. 5C.

Figure 6A:
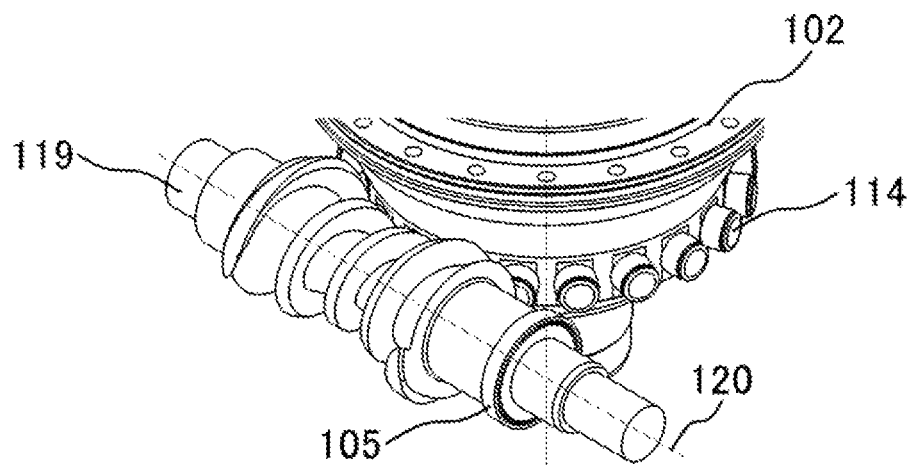
FIG. 6A is a partial perspective view of an inside of a rotational positioning device in which a graduated scale is integrally formed in the radial direction with respect to a rotational member axial line according to another embodiment of the present invention.
Figure 6B:
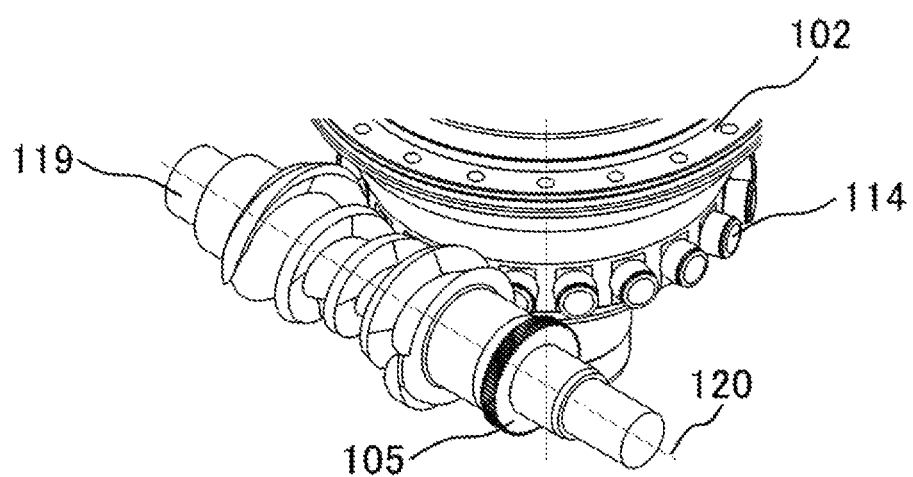
FIG. 6B is a partial perspective view of an inside of a rotational positioning device in which a graduated scale is integrally formed in a direction parallel to a rotational member axial line according to still another embodiment of the present invention.

The rotational positioning device 100 may be capable of detecting the angle change amount due to the rotation of the rotational table 113 for loading the machining works and the like of the machine tool. Therefore, the graduated scale 105 may be integrally formed with the second rotational member 119 serving as the input shaft shown in FIGS. 4B and 5B. In this case, as shown in FIGS. 6A and 6B, the rotational positioning device 100 includes: a housing 101; a second rotational member 119 rotatable about a second rotational member axial line 120; and at least one sensor 104 serving as an angle detector installed in the housing 101. A graduated scale 105 having a plurality of scale marks is integrally formed with the second rotational member 119 along the circumferential direction of the second rotational member 119. As shown in FIG. 6A, the scale marks of the graduated scale 105 may be formed integrally with the second rotational member 119 in the radial direction with respect to the second rotational member axial line 120 along the circumferential direction of the second rotational member 119. Alternatively, as shown in FIG. 6B, the scale marks may be integrally formed with the second rotational member 119 in a direction parallel to the second rotational member axial line 120. The rotational positioning device 100 further includes a rotational member 102 serving as an output shaft rotatable about a rotational member axial line 103. A transmission mechanism 114 is installed on the rotational member 102, serving as an output shaft, along the circumferential direction of the rotational member 102. Then, the second rotational member 119, serving as the input shaft, is in contact with the transmission mechanism 114. Therefore, as the second rotational member 119 rotates, the rotational member 102 serving as the output shaft can rotate. Note that, in this case, the rotational member 102 does not necessarily need a graduated scale 105 formed thereon, and both the rotational member 102 and the second rotational member 119 may have the graduated scales 105 formed thereon.

Thus integrally forming the graduated scale 105 on the input shaft can reduce the size of the rotational positioning device 100. Further, when the angle transmission precision between the input shaft and the output shaft is good, installing an angle detector on the input shaft allows a lower precision than installing an angle detector on the output shaft. For example, when the reduction ratio between the input shaft and the output shaft is 16 and the target positioning precision of the output shaft is 22 bits ($360°/2^{22}$), installing an angle detector on the output shaft directly needs 22-bit precision. On the other hand, installing the angle detector on the input shaft can lower the precision by 4 bits ($16=2^4$), that is, 18 bits can achieve the same precision, and this can reduce the cost.

Figure 7A:
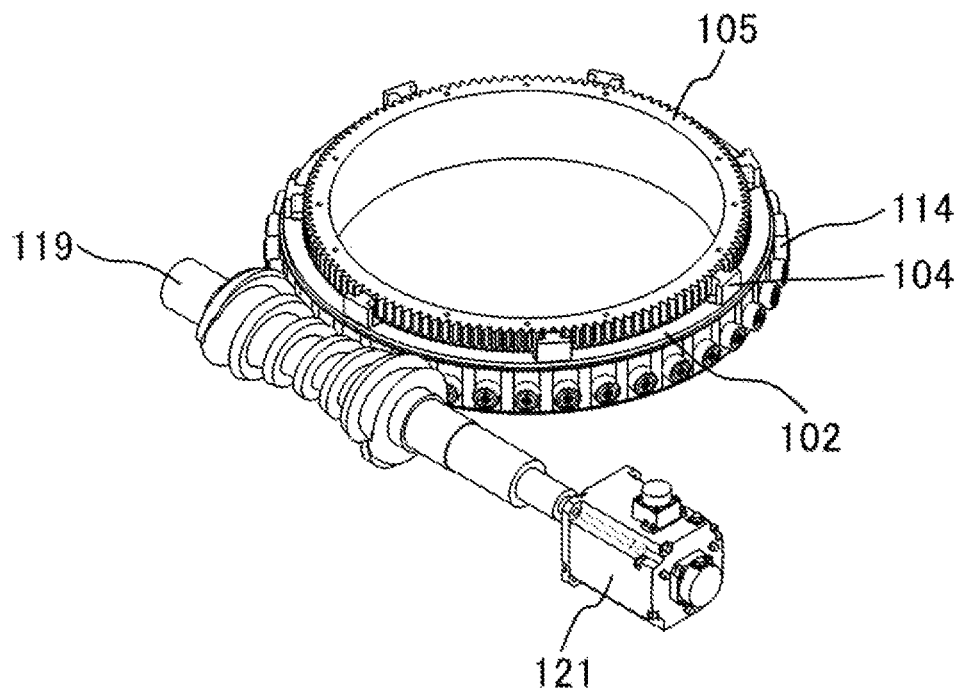
FIG. 7A is a perspective view of an inside of the rotational positioning device according to the embodiment shown in FIG. 2.
Figure 7B:
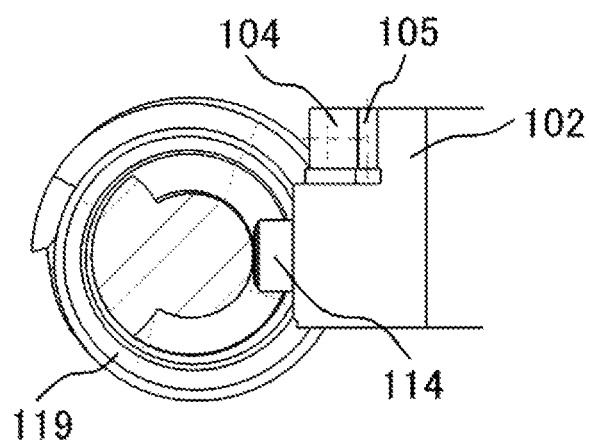
FIG. 7B is a partial cross-sectional view of the rotational positioning device according to the embodiment shown in FIG. 2.

FIGS. 7A and 7B each show an enlarged view of the inside of the rotational positioning device 100 according to the embodiment shown in FIG. 2. The size of the rotational positioning device 100 is changed according to the application. However, regardless of the size, the rotational positioning device 100 just has a graduated scale 105 formed integrally with the rotational member 102, and a sensor 104 installed along the circumferential direction of the rotational member 102, in the same manner as the above described. This allows creating a rotational positioning device 100 that is not limited in size.

Figure 8A:
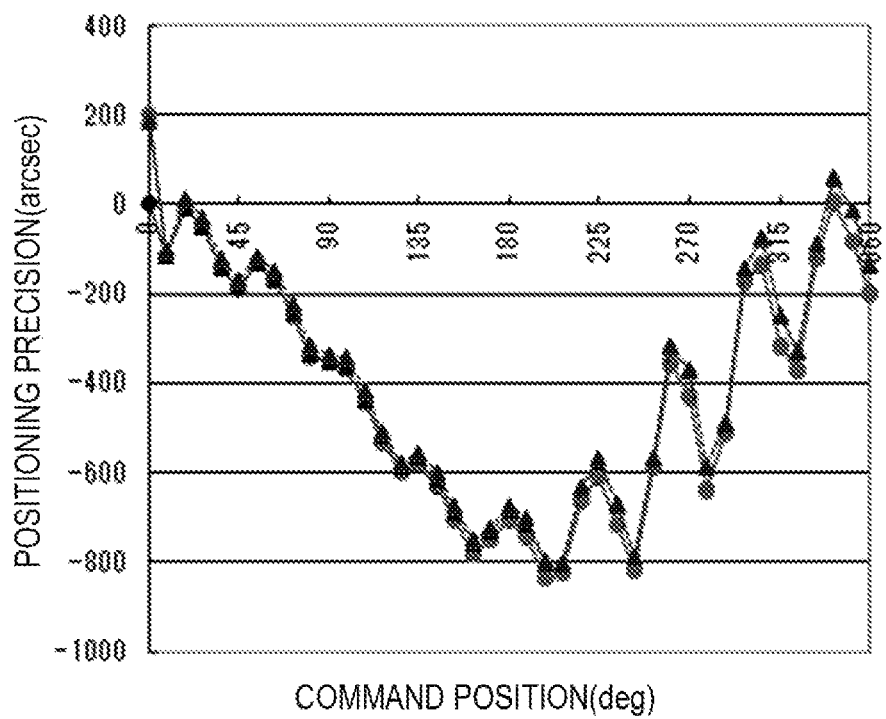
FIG. 8A is a diagram showing positioning precision with respect to a command position according to prior art.
Figure 8B:
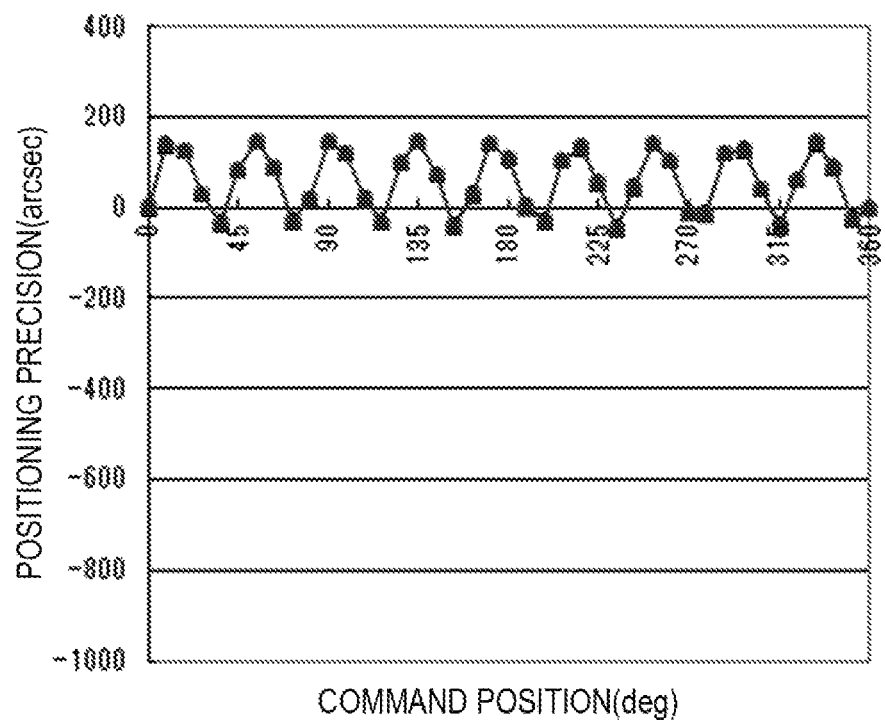
FIG. 8B is a diagram showing positioning precision with respect to a command position according to the present invention.

FIG. 8B shows an example of positioning precision with respect to a command position when there is no center deviation between the rotational member 102 and the graduated scale 105. FIG. 8A shows an example of positioning precision with respect to the command position when there is a center deviation between the rotational member 102 and the graduated scale 105. These examples are specific examples showing that integrally forming the graduated scale 105 on the rotational member 102 has improved the positioning precision. The positioning precision is based on the command position, which is the target angle position of the rotational member 102 serving as an output shaft. Specifically, the positioning precision has improved by about 600 arcsec, from a maximum of about 800 arcsec to a maximum of about 200 arcsec.

Figure 9A:
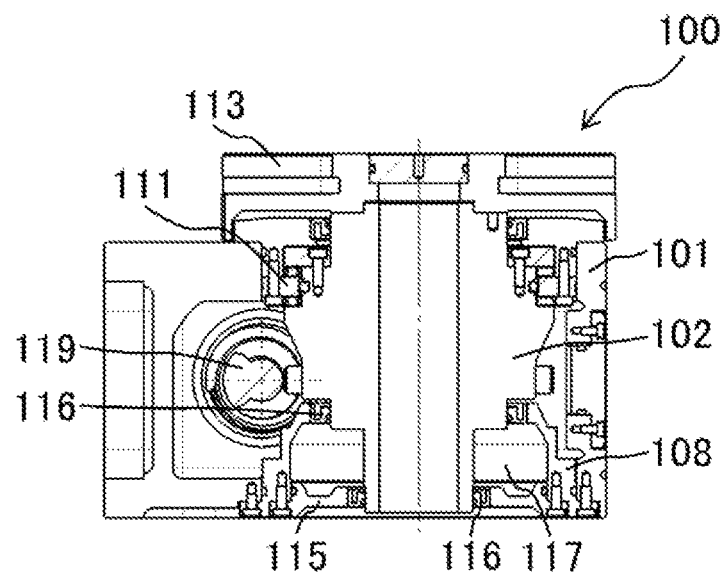
FIG. 9A is a cross-sectional view of a rotational positioning device according to the present invention.
Figure 9B:
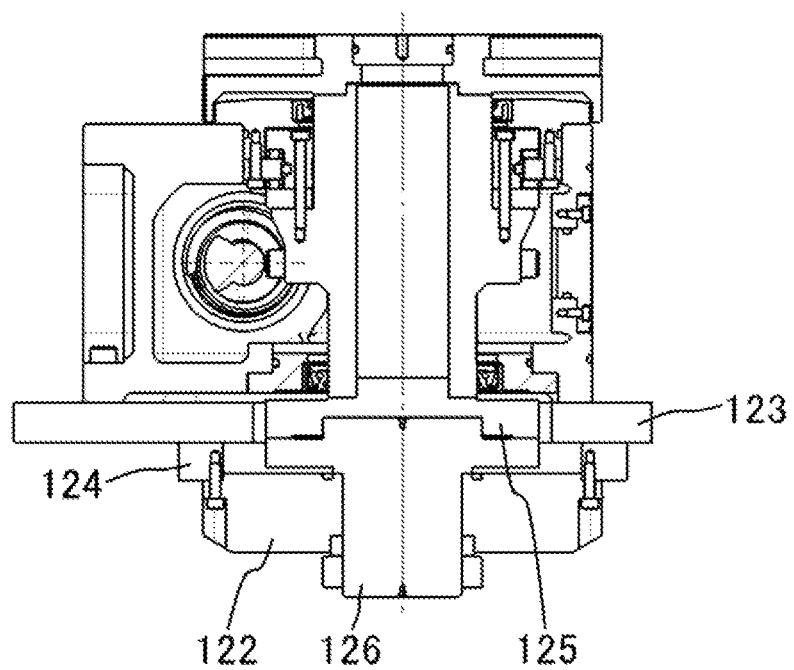
FIG. 9B is a cross-sectional view of a rotational positioning device according to prior art.

FIG. 9A is a cross-sectional view of a rotational positioning device 100 having: a graduated scale 105 integrally formed with a part of the rotational member 102 accommodated in a housing 101; and a sensor 104 installed in a sensor and cable installation space 117 in the housing 101. FIG. 9B shows a rotational positioning device when an angle detector is externally attached. In the rotational positioning device of FIG. 9B, an external encoder 122 serving as an angle detector is fixed to a housing via an installation base 123. The external encoder 122 has a fitting shaft 126 connected to an output shaft via an encoder collar 124 and an extension flange 125. On the other hand, in the rotational positioning device 100 of FIG. 9A, the sensor 104 is installed and the graduated scale 105 is formed, in the space which is a dead space in the conventional configuration. This can make the rotational positioning device 100 more compact than the conventional one, reduce the number of parts, and reduce the cost.

Figure 10A:
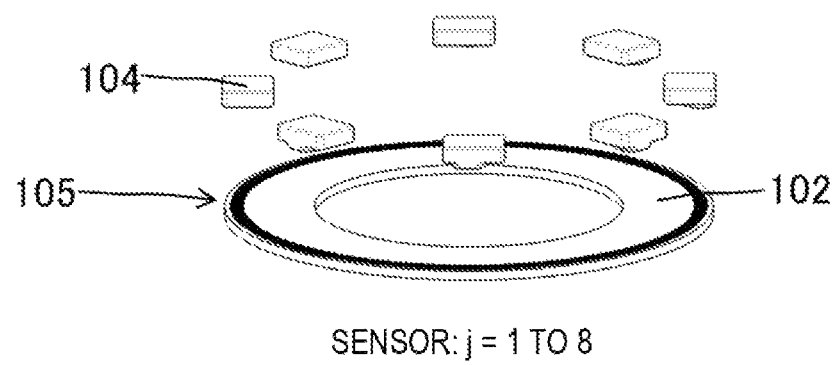
FIG. 10A is a schematic diagram of an angle detector with a self-calibration function.
Figure 10B:
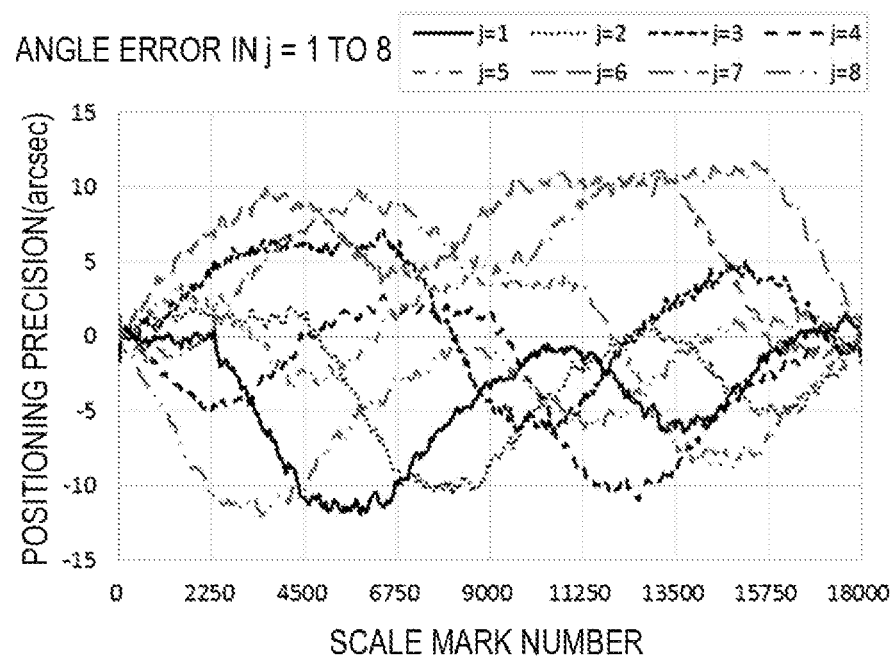
FIG. 10B is a diagram showing positioning precision with respect to scale mark numbers by each sensor of the angle detector with a self-calibration function of FIG. 10A.
Figure 10C:
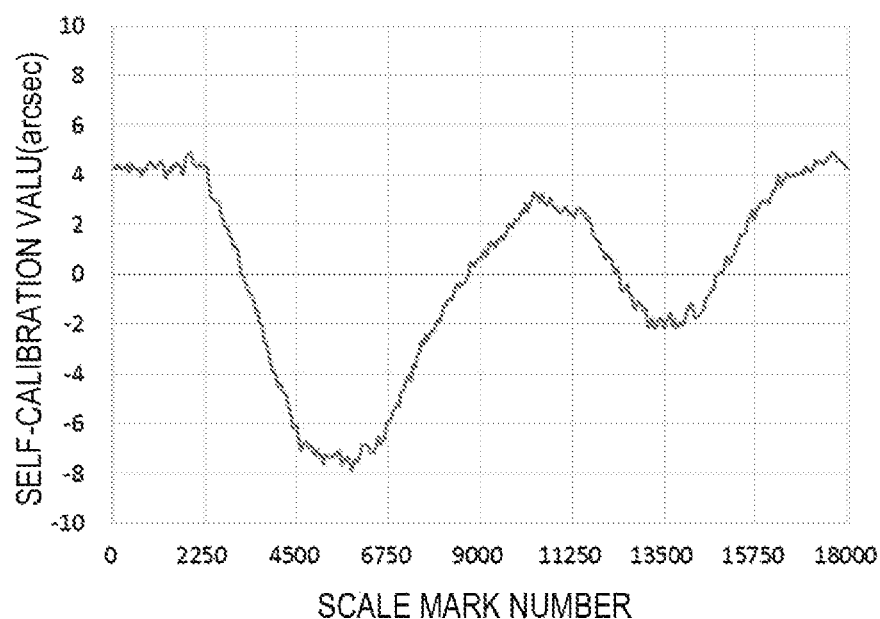
FIG. 10C is a diagram showing self-calibration values for scale mark numbers calculated by the angle detector with a self-calibration function of FIG. 10A.

The rotational positioning device 100 may employ the angle detector that is an angle detector with a self-calibration function as disclosed in Patent Literature 3 to 5. One angle detector with a self-calibration function as shown in FIG. 10A, due to its configuration, has a plurality of sensors 104 arranged along the circumferential direction of the rotational member 102. Each of the plurality of sensors 104 reads a graduated scale 105 having a plurality of scale marks integrally formed with the rotational member 102 in the radial direction with respect to the rotational member axial line 103 along the circumferential direction of the rotational member 102. Thereby, the angle change amount due to rotation of the rotational member 102 is detected based on the plurality of scale marks. FIG. 10B shows the positioning precision for scale mark numbers calculated from the angle change amount detected by each of the plurality of sensors 104. Based on the angle change amount detected by each of the plurality of sensors 104, there is calculated a calibration curve that eliminates the angle error shown in FIG. 10C. Then, the angle error based on this calibration curve is subtracted from the angle change amount of one representative sensor 104, so that there can be calculated the true angle change amount due to the rotation of the rotational table 113. Thus, employing the angle detector with a self-calibration function allows detecting the angle change amount of the rotational table 113 with high precision. Then, this allows positioning the rotational table 113 at the target angle position with high precision. Note that although the number of sensors is eight in FIG. 10A, the number may be two or more.

Figure 10D:
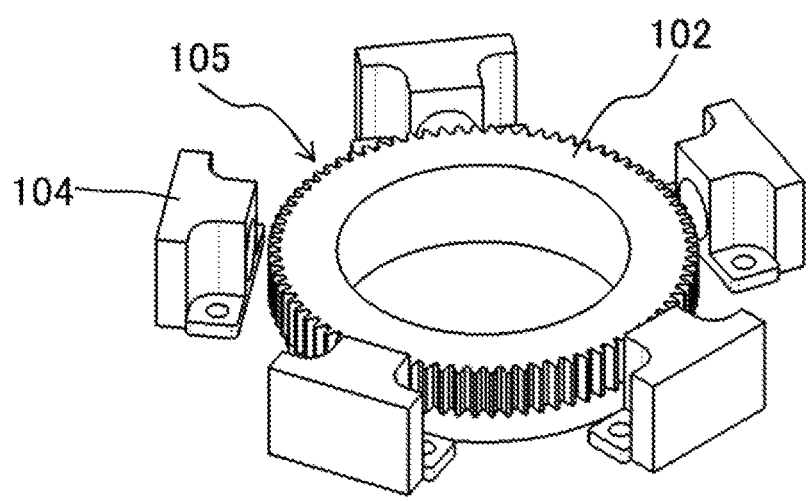
FIG. 10D is a schematic diagram of another angle detector with a self-calibration function.

Further, another angle detector with a self-calibration function as shown in FIG. 10D has, due to its configuration, a plurality of sensors 104 arranged along the circumferential direction of the rotational member 102. Each of the plurality of sensors 104 reads a graduated scale 105 having a plurality of scale marks integrally formed with the rotational member 102 in the direction parallel to the rotational member axial line 103 along the circumferential direction of the rotational member 102. Thereby, the angle change amount due to rotation of the rotational member 102 is detected based on the plurality of scale marks. The angle detector with a self-calibration function as shown in FIG. 10D can also obtain the same result as in FIGS. 10B and 10C. Note that although the number of sensors is five in FIG. 10D, the number may be two or more.

Figure 11A:
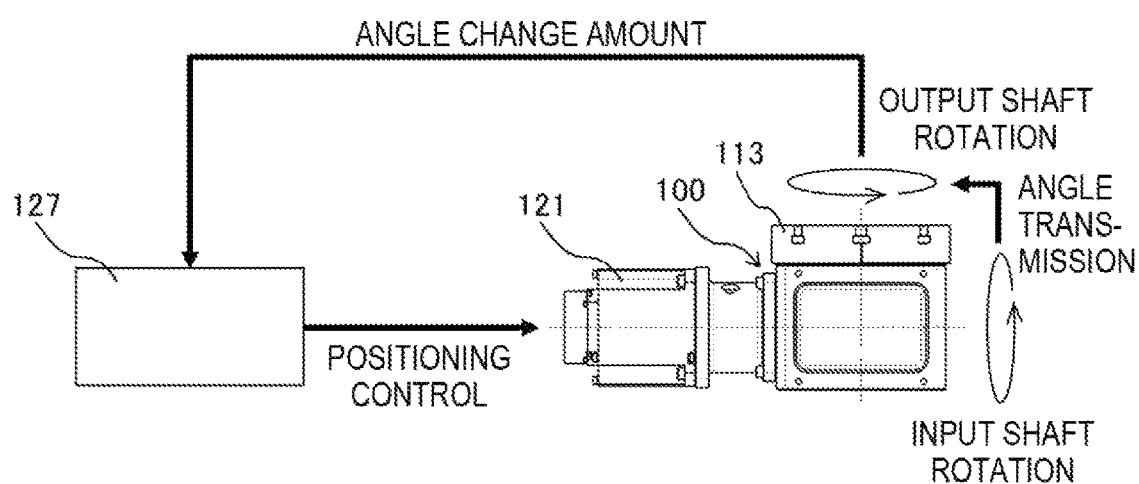
FIG. 11A is a diagram of a positioning control method according to an embodiment of the present invention.
Figure 11B:
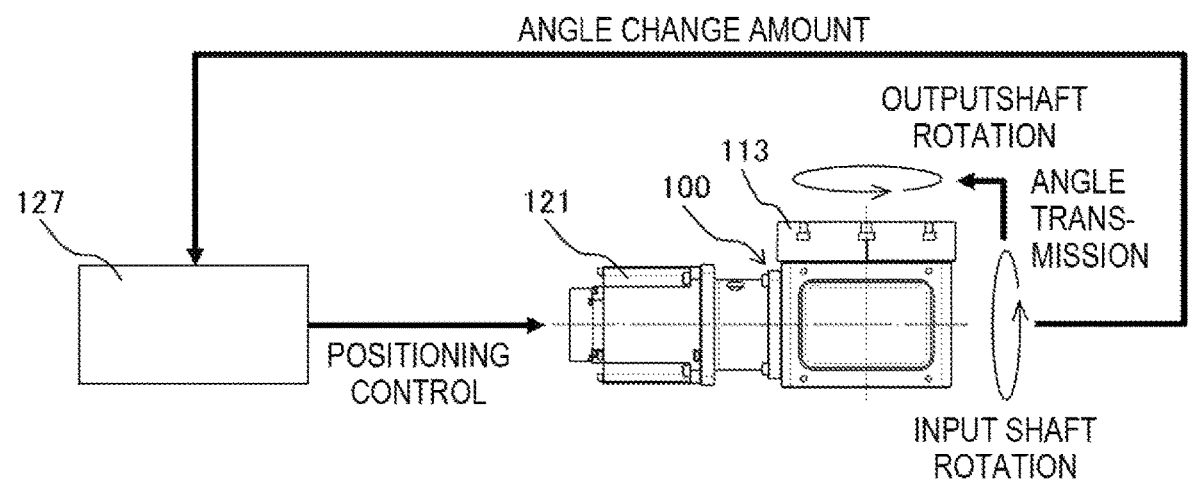
FIG. 11B is a diagram of a positioning control method according to another embodiment of the present invention.

FIG. 11A shows an example of a positioning control method using a rotational positioning device 100 in which a graduated scale 105 is formed integrally with a rotational member 102 serving as an output shaft. FIG. 11B shows an example of a positioning control method using a rotational positioning device 100 in which a graduated scale 105 is integrally formed with a second rotational member 119 serving as an input shaft. In the rotational positioning device 100, when the input shaft rotates as shown by an arrow, the rotational angle of the input shaft is transmitted, the output shaft rotates as shown by an arrow, and a rotational table 113 also rotates accordingly. A sensor 104 serving as an angle detector detects the angle change amount due to the rotation of the output shaft or the input shaft based on a plurality of scale marks of the graduated scale 105. The angle change amount is communicated to a controller or driver 127 for driving a motor 121 as a reference angle for positioning the rotational table 113. The controller or driver 127 controls the motor 121 according to the difference between the target angle position and the reference angle, and positions the rotational table 113 at the target angle position with high precision.

It should be further understood by persons skilled in the art that although the foregoing description has been made on embodiments of the present invention, the present invention is not limited thereto and various changes and modifications may be made without departing from the principle of the present invention and the scope of the appended claims.

The invention claimed is:

1. A rotational positioning device, comprising:
   a housing;
   a rotational member rotatable about a rotational member axial line, wherein a transmission mechanism is installed along a circumferential direction of the rotational member, at least a part of the rotational member being accommodated in the housing;
   a second rotational member rotatable about a second rotational member axial line;
   a sensor flange installed in the housing, wherein a circular rotational member hole is provided in the sensor flange; and
   at least one sensor installed in the sensor flange,
   wherein due to a contact between the transmission mechanism of the rotational member and the second rotational member, a rotation of one of the rotational member and the second rotational member enables a rotation of the other of the rotational member and the second rotational member;
   wherein a graduated scale having a plurality of scale marks is integrally formed with the rotational member along the circumferential direction of the rotational member, the at least one sensor detects an angle change amount due to the rotation of the rotational member based on the plurality of scale marks, and the rotational member is positioned at a target angle position based on the angle change amount;
   wherein at least a part of the rotational member is accommodated in the rotational member hole, whereby a central axis line of the rotational member hole is aligned with the rotational member axial line such that a position of the at least one sensor to the graduated scale is determined; and
   wherein a first seal is provided within the rotational member hole between the sensor flange and the rotational member to isolate the at least one sensor from the transmission mechanism so as to prevent a lubricant from entering a space where the at least one sensor is installed.

2. The rotational positioning device according to claim 1, wherein the graduated scale is integrally formed with the rotational member in a radial direction with respect to the rotational member axial line or a direction parallel to the rotational member axial line.

3. The rotational positioning device according to claim 1, wherein at least one seat is provided in the sensor flange, and the at least one sensor is installed in the at least one seat so as to define a position of the at least one sensor and a gap between the at least one sensor and the scale marks.

4. The rotational positioning device according to claim 1, further comprising a seal flange installed in the housing, wherein a second seal is provided between the seal flange and the rotational member to isolate the space from an external space.

5. The rotational positioning device according to claim 3, wherein the at least one seat is two or more seats provided along the circumferential direction of the rotational member, the two or more seats are provided such that distances from the rotational member axial line are the same and distances between adjacent seats are the same, the at least one sensor is two or more sensors, and each of the two or more sensors is installed in any one of the two or more seats.

6. The rotational positioning device according to claim 1, further comprising a bearing for supporting the rotation of the rotational member with respect to the housing, wherein a raceway surface of the bearing is integrally formed with the rotational member.

7. The rotational positioning device according to claim 1, wherein the graduated scale is integrally formed with a part of the rotational member accommodated in the housing.

8. The rotational positioning device according to claim 1, wherein the rotational member is an output shaft, a rotational table is provided at an end part of the output shaft, and the graduated scale is integrally formed with a part of the output shaft, the part being adjacent to the rotational table.

* * * * *